(12) United States Patent
Kamakura et al.

(10) Patent No.: US 10,539,175 B2
(45) Date of Patent: Jan. 21, 2020

(54) CONNECTING ROD

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Masanori Kamakura, Kariya (JP); Tetsuji Kozuru, Toyota (JP)

(73) Assignees: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 16/288,667

(22) Filed: Feb. 28, 2019

(65) Prior Publication Data

US 2019/0271353 A1    Sep. 5, 2019

(30) Foreign Application Priority Data

Mar. 1, 2018   (JP) .................................. 2018-036710

(51) Int. Cl.
   *F16C 7/02*     (2006.01)
   *F16C 9/04*     (2006.01)

(52) U.S. Cl.
   CPC ................ *F16C 7/023* (2013.01); *F16C 9/04* (2013.01); *F16C 2360/22* (2013.01)

(58) Field of Classification Search
   CPC ......... F16C 7/023; F16C 9/04; F16C 2360/22
   See application file for complete search history.

(56) References Cited

U.S. PATENT DOCUMENTS

| 758,397 | A | * | 4/1904 | Weiss | F16C 17/18 |
| | | | | | 384/294 |
| 2,990,218 | A | * | 6/1961 | Schlechtendahl | F16C 9/04 |
| | | | | | 384/430 |
| 3,266,339 | A | * | 8/1966 | Schlechtendahl | F16C 9/04 |
| | | | | | 74/579 R |
| 5,370,093 | A | * | 12/1994 | Hayes | F16C 7/023 |
| | | | | | 123/197.4 |
| 2002/0170161 | A1 | | 11/2002 | Cadle et al. | |
| 2005/0262963 | A1 | * | 12/2005 | Betsch | F16B 39/24 |
| | | | | | 74/579 R |

FOREIGN PATENT DOCUMENTS

| JP | 2003-49822 A | 2/2003 |
| JP | 2007-247705 A | 9/2007 |

* cited by examiner

*Primary Examiner* — Vicky A Johnson
(74) *Attorney, Agent, or Firm* — Sughrue Mion, PLLC

(57) ABSTRACT

A connecting rod includes a main body portion of which one end portion is provided with a piston pin and a cap that is fixed to another end portion of the main body portion with a pair of bolts. The cap is provided with a pair of bolt through-holes into which the pair of bolts is inserted respectively. The main body portion is provided with a pair of female screw holes positioned to be respectively coaxial with the pair of bolt through-holes. At least one of the female screw holes is formed as a blind hole. The cap is provided with a communication portion that extends in an outward direction approximately orthogonal to an axial direction of the bolt through-hole coaxial with the female screw hole formed as the blind hole and is open toward an outer wall surface of the cap.

5 Claims, 8 Drawing Sheets

CONNECTING ROD

TECHNICAL FIELD

The present disclosure relates to a connecting rod used for an internal combustion engine.

BACKGROUND

Various techniques related to a connecting rod used for an internal combustion engine have been proposed. For example, a connecting rod described in Japanese Unexamined Patent Publication No. 2007-247705 is provided with a main body portion of which one end portion is provided with a piston pin and a cap that is fixed to the other end portion of the main body portion with a pair of bolts. The cap is provided with a pair of bolt through-holes into which the pair of bolts is inserted, respectively. The main body portion is provided with a pair of female screw holes positioned to be respectively coaxial with the pair of bolt through-holes. The female screw holes may be formed as blind holes. The main body portion may be provided with a through-hole, through which the female screw holes formed as the blind holes and the outside of the main body portion communicate with each other, in order to discharge chips.

SUMMARY

The through-hole provided in the main body portion as described above may cause a decrease in strength of the main body portion. However, if the through-hole is not provided, a foreign substance such as cleaning liquid may remain in the female screw holes formed as the blind holes.

In this technical field, a connecting rod, with which it is possible to discharge a foreign substance remaining in a female screw hole while suppressing a decrease in strength of a main body portion of the connecting rod, is desired.

A connecting rod according to an aspect of the present disclosure includes a main body portion of which one end portion is provided with a piston pin and a cap that is fixed to another end portion of the main body portion with a pair of bolts. The cap is provided with a pair of bolt through-holes into which the pair of bolts is inserted respectively, the main body portion is provided with a pair of female screw holes positioned to be respectively coaxial with the pair of bolt through-holes, at least one of the female screw holes is formed as a blind hole, and the cap is provided with a communication portion that extends in an outward direction approximately orthogonal to an axial direction of the bolt through-hole coaxial with the female screw hole formed as the blind hole and is open toward an outer wall surface of the cap.

In the connecting rod, the communication portion may include a through-hole that extends in the outward direction approximately orthogonal to the axial direction of the bolt through-hole coaxial with the female screw hole formed as the blind hole and is open toward the outer wall surface of the cap.

In the connecting rod, the cap may be provided with a seat surface onto which a head portion of the bolt inserted into the bolt through-hole abuts, and a distance from the seat surface to an inner circumferential surface defining the through-hole may be equal to or greater than a minimum thickness of the cap in a direction approximately orthogonal to an axis of the bolt through-hole that is coaxial with the female screw hole formed as the blind hole.

In the connecting rod, the cap may be provided with a plurality of the through-holes.

In the connecting rod, the cap may be provided with a seat surface onto which a head portion of the bolt inserted into the bolt through-hole abuts, the communication portion may include a groove portion formed on the seat surface, and the groove portion may extend in the outward direction approximately orthogonal to the axial direction of the bolt through-hole coaxial with the female screw hole formed as the blind hole and is open toward the outer wall surface of the cap.

In the connecting rod, the cap may be provided with a plurality of the groove portions.

In the connecting rod, one of the female screw holes closer to the one end portion may be formed as the blind hole.

In the connecting rod, the main body portion may be provided with a rod portion that extends to connect the one end portion and the other end portion, a contact plane at which the main body portion and the cap overlap each other may be inclined with respect to a plane perpendicular to a direction in which the rod portion extends.

A connecting rod according to another aspect of the present disclosure includes a main body portion of which one end portion is provided with a piston pin and a cap that is fixed to another end portion of the main body portion with a pair of bolts. The cap is provided with a pair of bolt through-holes into which the pair of bolts is inserted respectively, the main body portion is provided with a pair of female screw holes positioned to be respectively coaxial with the pair of bolt through-holes, at least one of the female screw holes is formed as a blind hole, and the cap is provided with a communication portion through which the bolt through-hole that is coaxial with the female screw hole formed as the blind hole and an outside of the cap communicate with each other.

According to the present disclosure, it is possible to discharge a foreign substance remaining in a female screw hole while suppressing a decrease in strength of a main body portion of a connecting rod.

DETAILED DESCRIPTION

Hereinafter, a first embodiment and a second embodiment of a connecting rod in the present disclosure will be described in detail with reference to drawings. First, the first embodiment of the connecting rod in the present disclosure will be described based on FIGS. 1 to 4.

First Embodiment

Figure 1:
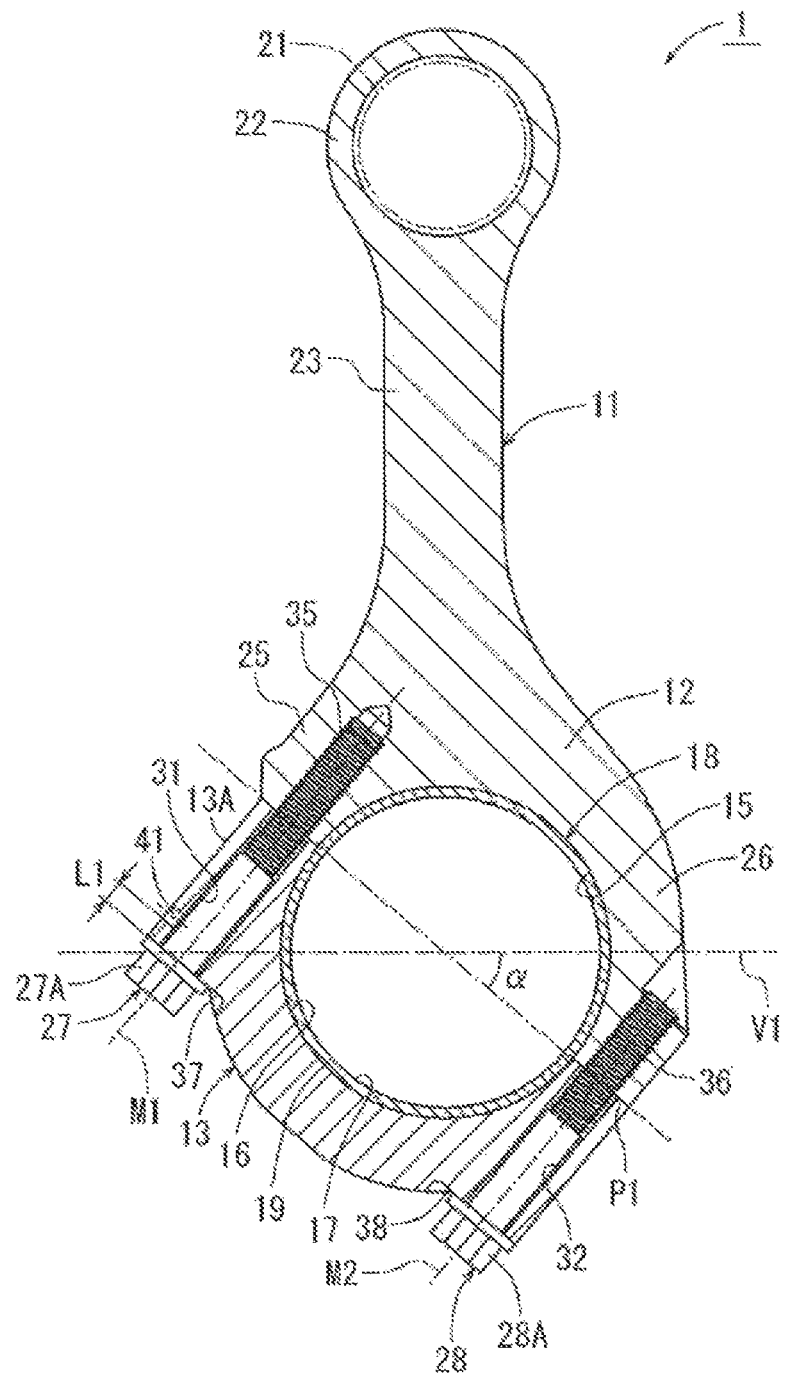
FIG. 1 is a sectional view of a connecting rod according to a first embodiment of the present disclosure.

As illustrated in FIG. 1, a connecting rod 1 according to the first embodiment is provided with a thin and long main body portion 11 and a cap 13. The main body portion 11 has a small end portion (one end portion) 22 provided with a piston pin 21. The main body portion 11 has a large end portion (another end portion) 12 which is opposite to the small end portion 22 in a longitudinal direction, the small end portion 22 being on the piston pin 21 side. The cap 13 is fixed to the large end portion (the other end portion) 12 of the main body portion 11 using an upper bolt 27 and a lower bolt 28, which are a pair of bolts. The large end portion 12 may be formed with a semi-arc-shaped recess portion 15. The cap 13 may be formed with a semi-arc-shaped recess portion 16. In this case, when the cap 13 is attached to the large end portion 12, opposite end portions of the recess portion 15 of the large end portion 12 in a circumferential direction and opposite end portions of the recess portion 16 of the cap 13 in the circumferential direction abut onto each other. A connection portion 18 for rotatably supporting a crank pin 17 is configured. Half-split type bearing metal 19 may be mounted on an inner circumferential surface of the connection portion 18.

The piston pin 21 connected to a piston may be rotatably inserted into the small end portion 22. The main body portion 11 has a rod portion 23 that extends to connect the small end portion 22 and the large end portion 12 to each other.

The main body portion 11 and the cap 13 overlap each other at a plane P1. The plane P1 is inclined with respect to a virtual plane V1 by an angle α, the virtual plane V1 being a plane perpendicular to a longitudinal direction of the rod portion 23 (direction in which the rod portion 23 extends). The inclination angle α is set to, for example, an angle of approximately 300 to 500. In this manner, a so-called diagonally split type connecting rod 1 is configured. In this case, the main body portion 11 is easily inserted into a cylinder block when assembling an engine, for example.

An upper bolt through-hole 31 is formed in the cap 13. The upper bolt 27 is inserted into the upper bolt through-hole 31. The upper bolt through-hole 31 extends toward an upper shoulder portion 25 of the large end portion 12. The upper shoulder portion 25 is a portion of the large end portion 12 that is positioned close to the small end portion 22 among a radially outer portion of the connection portion 18. A lower bolt through-hole 32 is formed in the cap 13. The lower bolt 28 is inserted into the lower bolt through-hole 32. The lower bolt through-hole 32 extends toward a lower shoulder portion 26 of the large end portion 12. The lower shoulder portion 26 is a portion of the large end portion 12 that is positioned distant from the small end portion 22 among the radially outer portion of the connection portion 18.

The main body portion 11 is provided with a pair of female screw holes 35 and 36 positioned to be respectively coaxial with the pair of upper bolt through-hole 31 and lower bolt through-hole 32. The female screw hole 35 is formed in the upper shoulder portion 25 such that the female screw hole 35 is on the same axis as an axis M1 of the upper bolt through-hole 31. The upper bolt 27 can be screwed into the female screw hole 35. The female screw hole 35 is formed as a blind hole that is not opened toward the upper shoulder portion 25. Therefore, the upper bolt through-hole 31 is a bolt through-hole coaxial with the female screw hole 35 formed as a blind hole. The female screw hole 36 is formed in the lower shoulder portion 26 such that the female screw hole 36 is on the same axis as an axis M2 of the lower bolt through-hole 32. The lower bolt 28 can be screwed into the female screw hole 36. The female screw hole 36 is formed in the lower shoulder portion 26 as a through-hole.

In the case of the connecting rod 1 configured as described above, the upper bolt 27 is inserted into the upper bolt through-hole 31 from the cap 13 side in a direction perpendicular to the plane P1 and the lower bolt 28 is inserted into the lower bolt through-hole 32 from the cap 13 side in the direction perpendicular to the plane P1 with the main body portion 11 and the cap 13 abutting onto each other at the plane P1. The upper bolt 27 is screwed into the female screw hole 35. The lower bolt 28 is screwed into the female screw hole 36. Therefore, the cap 13 is fixed to the main body portion 11. The upper bolt 27 and the lower bolt 28 may be formed to have the same length and the same screw diameter. The upper bolt 27 and the lower bolt 28 may be the same types of components.

The lower shoulder portion 26 may be cut such that a tip end portion of the lower bolt 28 slightly protrudes from the female screw hole 36.

Figure 2:
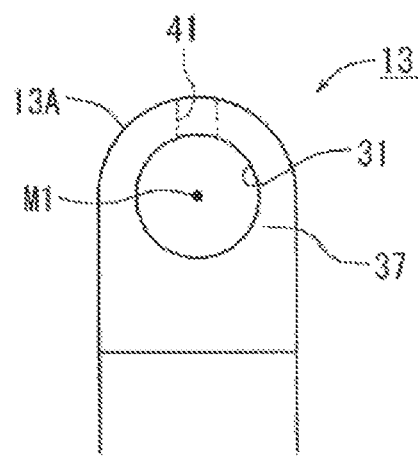
FIG. 2 is a plan view of a cap in FIG. 1 and illustrates a bolt through-hole close to a small end portion.

As illustrated in FIGS. 1 and 2, the cap 13 is provided with a seat surface 37, onto which a head portion 27A of the upper bolt 27 inserted into the upper bolt through-hole 31 abuts. The cap 13 is provided with a seat surface 38, onto which a head portion 28A of the lower bolt 28 inserted into the lower bolt through-hole 32 abuts. The seat surfaces 37 and 38 are disposed at both of the shoulder portions of the cap 13. Each of the seat surfaces 37 and 38 is formed as a flat surface parallel to the plane P1, for example.

The cap 13 is provided with a communication portion through which the upper bolt through-hole 31 and the outside of the cap 13 communicate with each other. In the case of the cap 13 described herein, a through-hole 41 is formed as the communication portion. The through-hole 41 extends in a direction intersecting an axial direction of the upper bolt through-hole 31. The through-hole 41 extends in an outward direction (in FIG. 1, oblique leftward and upward direction) approximately orthogonal to the axis M1 of the upper bolt through-hole 31 communicating with the female screw hole 35 and extends toward a radially outer side of the connection portion 18. The through-hole 41 is opened toward an outer wall surface 13A of the cap 13. The through-hole 41 may be formed to have a small diameter (for example, diameter of 2 mm to 3 mm) and to have a circular sectional shape. The through-hole 41 can be formed by using a working tool such as a drill. The sectional shape of the through-hole 41 is not limited to a circular shape and the through-hole 41 may be formed to have any sectional shape such as a rectangular sectional shape, a triangular sectional shape, and a hexagonal sectional shape.

A distance L1 from the seat surface 37 to an inner circumferential surface defining the through-hole 41 is equal to or greater than the minimum thickness of the cap 13 in a direction approximately orthogonal to the axis M1 of the upper bolt through-hole 31. The distance L1 is equal to or greater than the minimum thickness in a direction approximately orthogonal to the axis M1 of the upper bolt through-hole 31 communicating with the female screw hole 35. For example, as illustrated in FIG. 2, the minimum thickness is set to be equal to or greater than the thickness (for example, thickness of 3 mm to 5 mm) of a portion of the cap 13 in which the through-hole 41 is formed. That is, the minimum thickness is set to be equal to or greater than the length of the through-hole 41. The through-hole 41 may be formed to be close to the seat surface 37.

As described in detail above, in the case of the connecting rod 1 according to the first embodiment, the plane P1 is inclined with respect to the virtual plane V1, which is perpendicular to the longitudinal direction of the rod portion 23, by the angle α. The connecting rod 1 is a so-called diagonally split type connecting rod. Therefore, in the upper shoulder portion 25, the female screw hole 35 is positioned on the same axis as the axis M1 of the upper bolt through-hole 31 (to be coaxial with upper bolt through-hole 31). In the upper bolt through-hole 31, the through-hole 41 that penetrates toward the outer wall surface 13A of the cap 13 is formed to be close to the seat surface 37.

When the cap 13 is fixed to the main body portion 11 with the upper bolt 27 and the lower bolt 28 in a state where the crank pin 17 is interposed between the cap 13 and the main body portion 11, a foreign substance such as cleaning liquid remaining in the female screw hole 35 is discharged from the outer wall surface 13A of the cap 13 to the outside through the upper bolt through-hole 31 and the through-hole 41, in the form of a gas for example. Accordingly, since it is possible to avoid forming a through-hole in a base end portion (that is, upper shoulder portion 25) on the large end portion (other end portion) 12 side of the rod portion 23, it is possible to discharge a foreign substance such as cleaning liquid remaining in the female screw hole 35 while suppressing a decrease in strength of the main body portion 11 of the connecting rod 1. Since the cleaning liquid is discharged, a delayed fracture of the upper bolt 27 attributable to hydrogen brittleness can be suppressed.

The through-hole 41 is formed to be close to the seat surface 37 onto which the head portion 27A of the upper bolt 27 abuts. Therefore, it is possible to easily remove a burr or the like formed on an edge portion of the through-hole 41 close to an inner circumferential surface of the upper bolt through-hole 31. Since the distance L1 from the seat surface 37 to the inner circumferential surface defining the through-hole 41 is equal to or greater than the minimum thickness of the cap 13 in a direction approximately orthogonal to the axis M1 of the upper bolt through-hole 31 communicating with the female screw hole 35, it is possible to sufficiently secure the strength of the cap 13.

Figure 3:
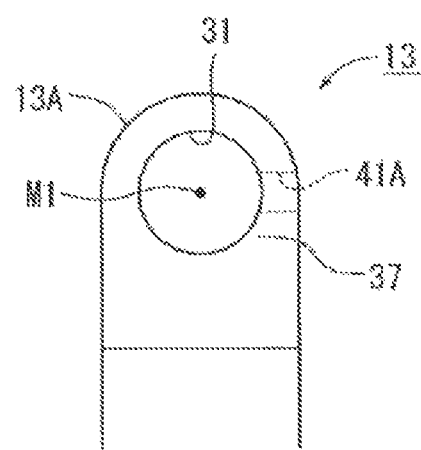
FIG. 3 is a plan view of a modification example of the cap in FIG. 2.
Figure 4:
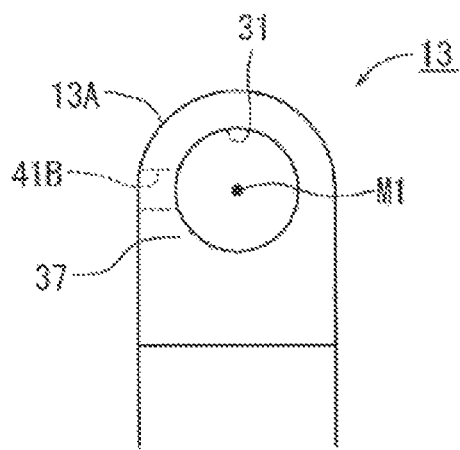
FIG. 4 is a plan view of a modification example of the cap in FIG. 2.

As illustrated in FIGS. 3 and 4, a direction in which the through-hole 41 extends is not limited to a direction orthogonal to the axial direction of the upper bolt through-hole 31 as long as the through-hole 41 extends in a direction intersecting the axial direction of the upper bolt through-hole 31. For example, instead of the through-hole 41, a through-hole 41A or a through-hole 41B may be provided. In these cases also, the distance L1 from the seat surface 37 to an inner circumferential surface defining the through-hole 41A may be equal to or greater than the minimum thickness of the cap 13 in a direction approximately orthogonal to the axis M1 of the upper bolt through-hole 31. The distance L1 to an inner circumferential surface defining the through-hole 41B may be equal to or greater than the minimum thickness of the cap 13 in a direction approximately orthogonal to the axis M1 of the upper bolt through-hole 31. The through-hole 41A or the through-hole 41B may be formed to be close to the seat surface 37. Accordingly, it is possible to achieve the same effect as that of the connecting rod 1 according to the first embodiment.

The cap 13 may be provided with a plurality of through-holes. For example, the cap 13 may be provided with a plurality of through-holes 41 arranged along the axial direction of the upper bolt through-hole 31. In this case, the length of an interval between the through-holes 41 may be equal to or greater than the minimum thickness of the cap 13 in a direction approximately orthogonal to the axis M1 of the upper bolt through-hole 31. Each through-hole 41 may be formed to be close to the seat surface 37. Accordingly, a foreign substance such as cleaning liquid remaining in the female screw hole 35 is more easily discharged from the outer wall surface 13A of the cap 13 to the outside through the upper bolt through-hole 31 and the plurality of through-holes 41, in the form of a gas for example. Therefore, a delayed fracture of the upper bolt 27 attributable to hydrogen brittleness can be suppressed.

For example, the cap 13 may be provided with a plurality of through-holes 41 arranged along a circumferential direction of the upper bolt through-hole 31. Accordingly, a foreign substance such as cleaning liquid remaining in the female screw hole 35 is more easily discharged from the outer wall surface 13A of the cap 13 to the outside through the upper bolt through-hole 31 and the plurality of through-holes 41, in the form of a gas for example. Therefore, a delayed fracture of the upper bolt 27 attributable to hydrogen brittleness can be suppressed.

Second Embodiment

Next, a configuration of a connecting rod 51 according to the second embodiment will be described with reference to FIGS. 5 and 6. The same reference numerals as those of components of the connecting rod 1 according to the first embodiment represent the same components as those of the connecting rod 1 or the corresponding components.

Figure 5:
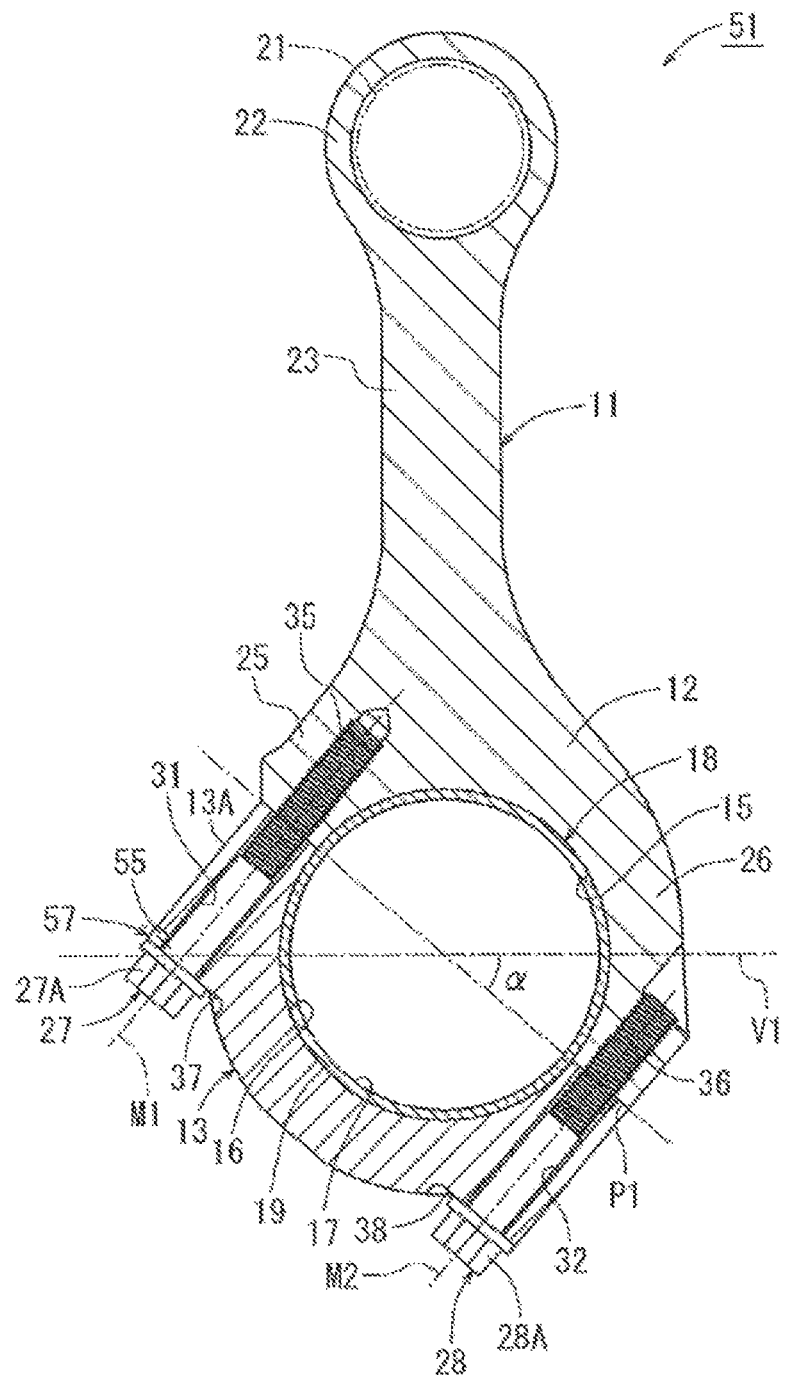
FIG. 5 is a sectional view of a connecting rod according to a second embodiment of the present disclosure.
Figure 6:
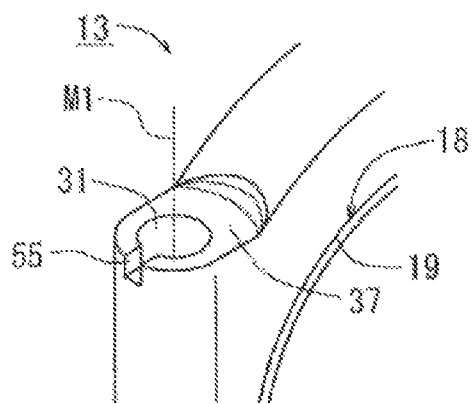
FIG. 6 is a perspective view of a cap in FIG. 5 and illustrates a bolt through-hole close to a small end portion.

As illustrated in FIGS. 5 and 6, the configuration of the connecting rod 51 is substantially the same as that of the connecting rod 1. The connecting rod 51 is different from the connecting rod 1 in a point that a groove portion 55 on the seat surface 37 is provided instead of the through-hole 41. The connecting rod 51 is the same as the connecting rod 1 in the other points and description about the common part therebetween will be omitted.

As illustrated in FIGS. 5 and 6, in the case of the cap 13 described herein, the groove portion 55 is formed on the seat surface 37 as the communication portion. The groove portion 55 is recessed by a predetermined depth (for example, depth of approximately 3 mm to 5 mm) to be approximately perpendicular to the seat surface 37. The groove portion 55 may be formed to have an approximately U-shaped section. The groove portion 55 may be formed over the entire width from the inner circumferential surface defining the upper bolt through-hole 31 to the outer wall surface 13A of the cap 13. The groove portion 55 extends in an outward direction (in FIG. 5, oblique leftward and upward direction) approximately orthogonal to the axis M1 of the upper bolt through-hole 31 and extends toward a radially outer side of the connection portion 18. The section the groove portion 55 is not limited to an approximately U-shaped section and may be an approximately V-shaped section, an approximately semi-arc shaped section, or the like.

When the cap 13 is fixed to the main body portion 11 with the upper bolt 27 and the lower bolt 28 in a state where the crank pin 17 is interposed between the cap 13 and the main body portion 11, the head portion 27A of the upper bolt 27 abuts onto the seat surface 37. Accordingly, a communication hole (communication portion) 57 that penetrates from an inner circumferential surface defining a lower end portion of the upper bolt through-hole 31 to the outer wall surface 13A of the cap 13 and has a rectangular section is formed by the head portion 27A and the groove portion 55.

When the cap 13 is fixed to the main body portion 11 with the upper bolt 27 and the lower bolt 28 in a state where the crank pin 17 is interposed between the cap 13 and the main body portion 11, a foreign substance such as cleaning liquid remaining in the female screw hole 35 is discharged from the outer wall surface 13A of the cap 13 to the outside through the upper bolt through-hole 31 and the communication hole 57, in the form of a gas for example. Therefore, a delayed fracture of the upper bolt 27 attributable to hydrogen brittleness can be suppressed.

Since it is possible to avoid forming a through-hole in a base end portion (that is, upper shoulder portion 25) close to the large end portion (other end portion) 12 side of the rod portion 23, it is possible to discharge a foreign substance such as cleaning liquid remaining in the female screw hole 35 while suppressing a decrease in strength of the main body portion 11 of the connecting rod 51. Since the groove portion 55 is formed on the seat surface 37 of the upper bolt through-hole 31, it is possible to sufficiently secure the strength of the cap 13.

Figure 7:
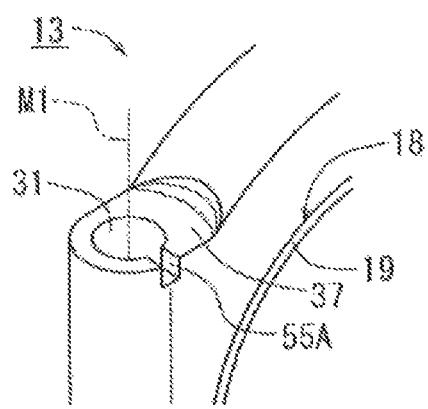
FIG. 7 is a plan view of a modification example of the cap in FIG. 6.
Figure 8:
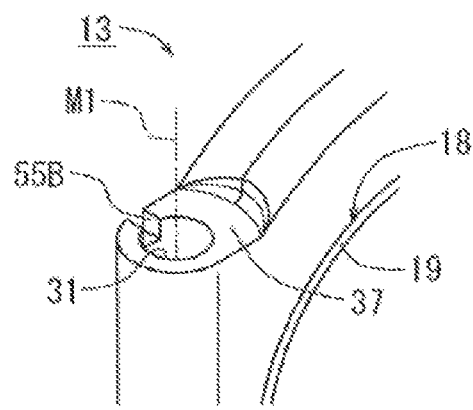
FIG. 8 is a plan view of a modification example of the cap in FIG. 6.

As illustrated in FIGS. 7 and 8, a direction in which the groove portion 55 extends is not limited to a direction orthogonal to the axial direction of the upper bolt through-hole 31 as long as the groove portion 55 extends in a direction intersecting the axial direction of the upper bolt through-hole 31. For example, instead of the groove portion 55, a groove portion 55A or a groove portion 55B may be provided. When the cap 13 is fixed to the main body portion 11 with the upper bolt 27 and the lower bolt 28 in a state where the crank pin 17 is interposed between the cap 13 and the main body portion 11, a communication hole (communication portion) that penetrates from the inner circumferential surface defining the lower end portion of the upper bolt through-hole 31 to the outer wall surface 13A of the cap 13 and has a rectangular section is formed by the head portion 27A of the upper bolt 27 abutting onto the seat surface 37 and the groove portion 55A, or by the head portion 27A and the groove portion 55B. Accordingly, it is possible to achieve the same effect as that of the connecting rod 51 according to the second embodiment.

The cap 13 may be provided with a plurality of groove portions. For example, the groove portion 55 illustrated in FIG. 6 and the groove portion 55A illustrated in FIG. 7 may be formed on the seat surface 37. The groove portion 55 illustrated in FIG. 6 and the groove portion 55B illustrated in FIG. 8 may be formed on the seat surface 37, for example. The groove portion 55A illustrated in FIG. 7 and the groove portion 55B illustrated in FIG. 8 may be formed on the seat surface 37, for example. The groove portion 55 illustrated in FIG. 6, the groove portion 55A illustrated in FIG. 7, and the groove portion 55B illustrated in FIG. 8 may be formed in the seat surface 37, for example.

Accordingly, when the cap 13 is fixed to the main body portion 11 with the upper bolt 27 and the lower bolt 28 in a state where the crank pin 17 is interposed between the cap 13 and the main body portion 11, a plurality of communication holes (communication portions) open toward the outer wall surface 13A of the cap 13 is formed by the head portion 27A of the upper bolt 27 and at least two of the plurality of groove portions 55, 55A, and 55B. Therefore, a foreign substance such as cleaning liquid remaining in the female screw hole 35 is more easily discharged from the outer wall surface 13A of the cap 13 to the outside through the upper bolt through-hole 31 and the plurality of communication holes, in the form of a gas for example. Therefore, a delayed fracture of the upper bolt 27 attributable to hydrogen brittleness can be suppressed.

The configuration, structure, external appearance, shape, and the like of the connecting rod according to the present disclosure is not limited to those described in the first and second embodiments. Various modifications, improvements, additions, deletions can be made without changing the gist of the disclosure. The first and second embodiments may be appropriately combined with each other.

The subject of the present disclosure is represented as the following aspects, for example.

Various techniques related to a connecting rod used for an internal combustion engine have been proposed. For example, in the case of a connecting rod described in Japanese Unexamined Patent Publication No. 2007-247705, an outer portion of a cap is provided with a bolt through-hole penetrating the cap in an upward direction and an outer portion of a large end portion of a connecting rod main body is provided with a bolt female screw hole that extends on the same axis as the bolt through-hole. An incomplete thread portion remaining in a tip end portion of the bolt female screw hole is formed not to reach a shoulder portion of the large end portion and is formed as a blind hole not open toward the shoulder portion.

In addition, a cylindrical portion of the incomplete thread portion is provided with a through-hole that extends in a leftward and outward direction approximately orthogonal to an axis of the bolt female screw hole from the cylindrical portion and is open to a longitudinal surface of the large end portion of the connecting rod main body such that chips remaining in the vicinity of the tip end portion of the bolt female screw hole are smoothly discharged via the through-hole. In addition, even when cleaning liquid or the like is accumulated on the incomplete thread portion, the cleaning liquid is evaporated via the through-hole and thus a delayed fracture of a connecting rod bolt attributable to hydrogen brittleness can be suppressed.

However, in the case of a diagonally split type connecting rod, a contact plane at which a connecting rod main body and a cap overlap each other is inclined with respect to a plane perpendicular to a longitudinal direction of the connecting rod. As a result, a tip end portion of a bolt female screw hole close to a connecting rod small end portion is positioned near a base end portion close to a large end portion side of a rod portion. Therefore, when a through-hole is formed to extend in an outward direction approximately orthogonal to an axis of the bolt female screw hole from a cylindrical portion of an incomplete thread portion, there is a problem that the stress is concentrated on the through-hole and the strength of the connecting rod main body in the side of large end portion becomes insufficient.

Meanwhile, when the through-hole that extends in an outward direction approximately orthogonal to the axis of the bolt female screw hole from the cylindrical portion of the incomplete thread portion is not formed, there is a possibility of a delayed fracture of a connecting rod bolt attributable to hydrogen brittleness, due to cleaning liquid or the like accumulated in the incomplete thread portion. Furthermore, when the vicinity of the through-hole is thickened for reinforcement, there is a problem that it becomes difficult to achieve reduction in size of the connecting rod and in manufacturing cost.

Therefore, an embodiment of the present disclosure has been devised in consideration of the above-described point and an object thereof is to provide a connecting rod with which it is possible to suppress a delayed fracture of a connecting rod bolt attributable to hydrogen brittleness while suppressing a decrease in strength of the other end portion side of a connecting rod main body.

Aspect 1

A connecting rod including:

a connecting rod main body that has one end portion into which a piston pin is rotatably fitted;

a cap that is fixed with a crank pin interposed between the cap and the other end portion of the connecting rod main body, in which the cap is provided with a pair of bolt through-holes into each of which a connecting rod bolt is inserted, the connecting rod main body is provided with a pair of bolt female screw holes positioned on the same axes as the pair of bolt through-holes respectively, at least one of the pair of bolt female screw holes is formed as a blind hole, and the bolt through-hole communicating with the blind hole is provided with a communication portion that extends in an outward direction approximately orthogonal to the axis of the bolt through-hole and is open toward an outer wall surface of the cap.

According to Aspect 1, at least one of the pair of bolt female screw holes is formed as a blind hole. In addition, the bolt through-hole that communicates with the blind hole from among the pair of bolt through-holes provided in the cap is provided with the communication portion that extends in the outward direction approximately orthogonal to the axis of the bolt through-hole and is open toward the outer wall surface of the cap.

Accordingly, when the cap is fixed to the connecting rod main body with a pair of connecting rod bolts in a state where a crank pin is interposed between the cap and the connecting rod main body, a foreign substance such as cleaning liquid remaining in the blind hole is discharged from the outer wall surface of the cap to the outside via the bolt through-hole communicating with the blind hole and the communication portion, in the form of gas for example. Therefore, a delayed fracture of the connecting rod bolt attributable to hydrogen brittleness can be suppressed. In addition, since it is not necessary to form a through-hole close to the other end portion of the connecting rod main body (that is, it is not necessary to form through-hole close to large end portion), it is possible to suppress a decrease in strength of the other end portion side of the connecting rod main body.

Aspect 2

The connecting rod described in Aspect 1, in which the communication portion includes a through-hole that extends in the outward direction approximately orthogonal to the axis of the bolt through-hole and is open toward the outer wall surface of the cap.

According to Aspect 2, when the cap is fixed to the connecting rod main body with the pair of connecting rod bolts in a state where the crank pin is interposed between the cap and the connecting rod main body, a foreign substance such as cleaning liquid remaining in the blind hole is discharged from the outer wall surface of the cap to the outside via the bolt through-hole communicating with the blind hole and the through-hole, in the form of gas for example. Therefore, a delayed fracture of the connecting rod bolt attributable to hydrogen brittleness can be suppressed.

Aspect 3

The connecting rod described in Aspect 2, in which the cap is provided with a seat surface on which a head portion of the connecting rod bolt inserted into the bolt through-hole communicating with the blind hole is seated, and the through-hole is formed to be close to the seat surface and a distance from the seat surface to an inner circumferential surface defining the through-hole is set to be equal to or greater than a minimum thickness in a direction approximately orthogonal to the axis of the bolt through-hole communicating with the blind hole.

According to Aspect 3, the through-hole is formed close to the seat surface on which the head portion of the connecting rod bolt is seated. Therefore, it is possible to easily remove a burr or the like formed on an edge portion of the through-hole close to an inner circumferential surface of the bolt through-hole. In addition, since the distance from the seat surface to the inner circumferential surface defining the through-hole is set to be equal to or greater than the minimum thickness in the direction approximately orthogonal to the axis of the bolt through-hole communicating with the blind hole, it is possible to sufficiently secure the strength of the cap.

Aspect 4

The connecting rod described in Aspects 2 or 3, in which a plurality of the through-holes is provided in the bolt through-hole communicating with the blind hole.

According to Aspect 4, since the plurality of through-holes is provided in the bolt through-hole communicating with the blind hole, cleaning liquid or the like remaining in the blind hole is quickly discharged from the outer wall surface of the cap to the outside via the bolt through-hole communicating with the blind hole and the plurality of through-holes, in the form of gas for example. Therefore, a delayed fracture of the connecting rod bolt attributable to hydrogen brittleness can be suppressed.

Aspect 5

The connecting rod described in Aspect 1, in which the cap is provided with a seat surface onto which a head portion of the connecting rod bolt inserted into the bolt through-hole communicating with the blind hole abuts, the communication portion includes a groove portion that is formed on the seat surface and extends in the outward direction approximately orthogonal to the axis of the bolt through-hole, and a communication hole open toward the outer wall surface of the cap is formed by the head portion of the connecting rod bolt abutting onto the seat surface and the groove portion.

According to Aspect 5, when the cap is fixed to the connecting rod main body with the pair of connecting rod bolts in a state where the crank pin is interposed between the cap and the connecting rod main body, the communication hole open toward the outer wall surface of the cap is formed by the head portion of the connecting rod bolt abutting onto the seat surface and the groove portion that is formed on the seat surface and extends in the outward direction approximately orthogonal to the axis of the bolt through-hole. Accordingly, a foreign substance such as cleaning liquid remaining in the blind hole is discharged from the outer wall surface of the cap to the outside via the bolt through-hole communicating with the blind hole and the communication hole, in the form of gas for example. Therefore, a delayed fracture of the connecting rod bolt attributable to hydrogen brittleness can be suppressed.

Aspect 6

The connecting rod according to Aspect 5, in which a plurality of the groove portions is provided on the seat surface.

According to Aspect 6, the plurality of groove portions is provided on the seat surface. Therefore, when the cap is fixed to the connecting rod main body with the pair of connecting rod bolts in a state where the crank pin is interposed between the cap and the connecting rod main body, the plurality of communication holes open toward the outer wall surface of the cap is formed by the head portion of the connecting rod bolt abutting onto the seat surface and the plurality of groove portions that is formed on the seat surface. Accordingly, a foreign substance such as cleaning liquid remaining in the blind hole is discharged from the outer wall surface of the cap to the outside via the bolt through-hole communicating with the blind hole and the plurality of communication holes, in the form of gas for example. Therefore, a delayed fracture of the connecting rod bolt attributable to hydrogen brittleness can be suppressed.

Aspect 7

The connecting rod described in any one of Aspects 1 to 6,
  in which the connecting rod main body is provided with a rod portion that connects the one end portion and the other end portion,
  a contact plane at which the connecting rod main body and the cap overlap each other is inclined with respect to a plane perpendicular to a longitudinal direction of the rod portion, and
  the bolt female screw hole that is formed closer to the one end portion from among the pair of the bolt female screw holes is formed as the blind hole.

According to Aspect 7, the contact plane at which the connecting rod main body and the cap overlap each other is inclined with respect to the plane perpendicular to the longitudinal direction of the rod portion that connects the one end portion and the other end portion of the connecting rod main body to each other. The connecting rod is a so-called diagonally split type. In addition, the bolt female screw hole that is formed closer to the one end portion from among the pair of the bolt female screw holes of the connecting rod main body is formed as the blind hole.

Accordingly, when the cap is fixed to the connecting rod main body with the pair of connecting rod bolts in a state where the crank pin is interposed between the cap and the connecting rod main body, a foreign substance such as cleaning liquid remaining in the blind hole is discharged from the outer wall surface of the cap to the outside via the bolt through-hole communicating with the blind hole which is close to the one end portion side of the main body portion and the communication portion, in the form of gas for example. Therefore, a delayed fracture of the connecting rod bolt attributable to hydrogen brittleness can be suppressed. In addition, since it is not necessary to form a through-hole close to the other end portion of the connecting rod main body (that is, it is not necessary to form through-hole near base end portion that is close to other end portion side of rod portion), it is possible to suppress a decrease in strength of the other end portion side of the connecting rod main body.

What is claimed is:

1. A connecting rod comprising:
a main body portion of which one end portion is provided with a piston pin; and
a cap that is fixed to another end portion of the main body portion with a pair of bolts,
wherein the cap is provided with a pair of bolt through-holes into which the pair of bolts is inserted respectively,
wherein the main body portion is provided with a pair of female screw holes positioned to be respectively coaxial with the pair of bolt through-holes,
wherein at least one of the female screw holes is formed as a blind hole,
wherein the cap is provided with a communication portion that extends in an outward direction approximately orthogonal to an axial direction of the bolt through-hole coaxial with the female screw hole formed as the blind hole and is open toward an outer wall surface of the cap, and
wherein the communication portion includes a through-hole that extends in the outward direction approximately orthogonal to the axial direction of the bolt through-hole coaxial with the female screw hole formed as the blind hole and is open toward the outer wall surface of the cap.

2. The connecting rod according to claim 1,
wherein the cap is provided with a seat surface onto which a head portion of the bolt inserted into the bolt through-hole abuts, and
wherein a distance from the seat surface to an inner circumferential surface defining the through-hole is equal to or greater than a minimum thickness of the cap in a direction approximately orthogonal to an axis of the bolt through-hole that is coaxial with the female screw hole formed as the blind hole.

3. A connecting rod comprising:
a main body portion of which one end portion is provided with a piston pin; and
a cap that is fixed to another end portion of the main body portion with a pair of bolts,
wherein the cap is provided with a pair of bolt through-holes into which the pair of bolts is inserted respectively,
wherein the main body portion is provided with a pair of female screw holes positioned to be respectively coaxial with the pair of bolt through-holes,
wherein at least one of the female screw holes is formed as a blind hole,
wherein the cap is provided with a communication portion that extends in an outward direction approximately orthogonal to an axial direction of the bolt through-hole coaxial with the female screw hole formed as the blind hole and is open toward an outer wall surface of the cap,
wherein the cap is provided with a seat surface onto which a head portion of the bolt inserted into the bolt through-hole abuts,
wherein the communication portion includes a groove portion formed on the seat surface, and
wherein the groove portion extends in the outward direction approximately orthogonal to the axial direction of the bolt through-hole coaxial with the female screw hole formed as the blind hole and is open toward the outer wall surface of the cap.

4. A connecting rod comprising:
a main body portion of which one end portion is provided with a piston pin; and
a cap that is fixed to another end portion of the main body portion with a pair of bolts,
wherein the cap is provided with a pair of bolt through-holes into which the pair of bolts is inserted respectively,
wherein the main body portion is provided with a pair of female screw holes positioned to be respectively coaxial with the pair of bolt through-holes,
wherein at least one of the female screw holes is formed as a blind hole,
wherein the cap is provided with a communication portion that extends in an outward direction approximately orthogonal to an axial direction of the bolt through-hole coaxial with the female screw hole formed as the blind hole and is open toward an outer wall surface of the cap, and wherein one of the female screw holes closer to the one end portion is formed as the blind hole, wherein the main body portion is provided with a rod portion that extends to connect the one end portion and the other end portion, wherein a contact plane at which the main body portion and the cap overlap each other is inclined with respect to a plane perpendicular to a direction in which the rod portion extends.

5. A connecting rod comprising:

a main body portion of which one end portion is provided with a piston pin; and a cap that is fixed to another end portion of the main body portion with a pair of bolts, wherein the cap is provided with a pair of bolt through-holes into which the pair of bolts is inserted respectively, wherein the main body portion is provided with a pair of female screw holes positioned to be respectively coaxial with the pair of bolt through-holes, wherein at least one of the female screw holes is formed as a blind hole, and wherein the cap is provided with a communication portion through which the bolt through-hole that is coaxial with the female screw hole formed as the blind hole and an outside of the cap communicate with each other.

* * * * *